UNITED STATES PATENT OFFICE.

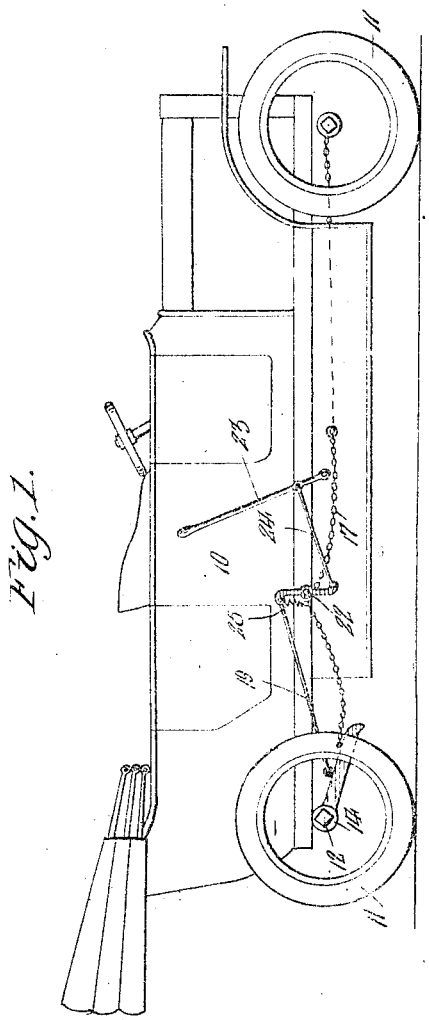
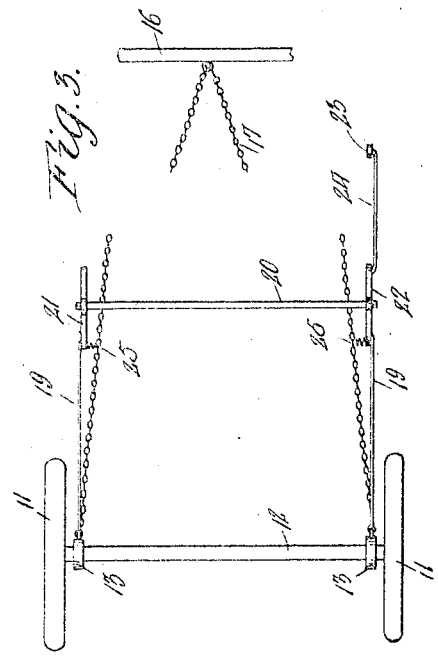
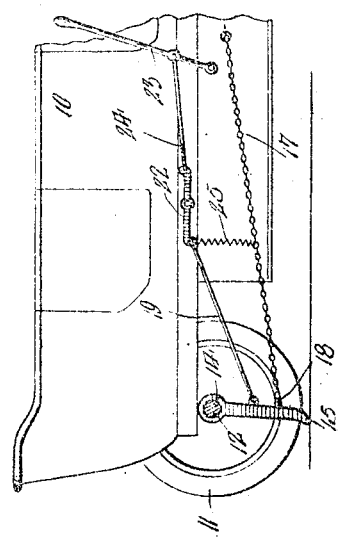

ROBERT A. HOUSTON, OF CLARKSTON, WASHINGTON.

EMERGENCY-BRAKE FOR AUTOMOBILES.

1,115,821.
Specification of Letters Patent.
Patented Nov. 3, 1914.

Application filed June 14, 1912. Serial No. 703,671.

*To all whom it may concern:*

Be it known that I, ROBERT A. HOUSTON, a citizen of the United States, residing at Clarkston, in the county of Asotin and State of Washington, have invented new and useful Improvements in Emergency-Brakes for Automobiles, of which the following is a specification.

This invention relates to an emergency brake for automobiles and other vehicles, and more particularly to a brake which is used only occasionally or to avert accident and under ordinary conditions the usual form of brake will be employed to check the forward movement of the machine.

The primary object of the present invention is to provide simple and efficient means whereby in case there is a possibility of an accident, or for other reasons, the progress of an automobile or other vehicle may be readily and quickly checked by raising the driving wheels of the vehicle from the ground and thus permit the engine to rotate the driving axle and wheels of the vehicle without resulting in a propulsion of the latter.

A further object of the present invention is to provide an emergency brake for automobiles, as before described, which will be inexpensive to manufacture, strong, durable and efficient in use and automatically operated from the driver's seat.

Other objects will appear as the description continues.

With the above and other objects in view, this invention consists of the novel construction, combination, formation and arrangement of parts as will be hereinafter more fully described, claimed and particularly pointed out in the appended drawings, in which:—

Figure 1 is a side elevation of the improved emergency brake embodying my invention as applied to an automobile, Fig. 2 illustrates my invention when in use and as applied to the rear portion of an automobile, and Fig. 3 is a plan view of my invention as applied to the frame of the automobile.

Reference now being had to the accompanying drawings, wherein like parts are indicated by like references throughout the several views, the numeral 10 indicates the usual bed or frame of an ordinary automobile which is supported by the usual wheels 11. Suspended from the rear axle 12 of the automobile adjacent the rear driving wheels is a pair of supporting members 13. These supporting members are provided at one end with a sleeve 14 which is loosely mounted upon the rear axle of the vehicle and its opposite end is off-set as at 15 to form a foot when the same is raised upon the ground. This foot 15 may be provided with teeth if desired to prevent any slipping of the same.

Secured to the central portion of the front axle 16 is a pair of rearwardly extending chains 17 which are connected adjacent the lower extremity of the supporting member 15 as at 18. These claims limit the movement of the supporting members to and hold the supporting members in a substantially vertical position when the emergency brake has been applied and also relieve the connecting rod 19, which will be hereinafter described, from any strain.

Mounted transversely of the vehicle frame is a rock shaft 20 having mounted on one extremity thereof a crank 21 which is connected to one of the supporting members 15 by a connecting rod 19 and the opposite extremity of said rock shaft is provided with a double crank 22, one end of which is connected to the opposite supporting member 15 by a connecting rod 19.

Pivotally mounted adjacent the driver's seat is a lever 23 which is connected to the opposite extremity of the double crank 22 by means of a rod 24. It is obvious that when this lever is thrown in a forward direction it will cause the supporting members to be thrown into contact with the ground, thereby holding the rear portion of the vehicle in a raised position. Extending from each of the cranks 21 and 22 are coiled springs 25 which are connected to the chains 17 which will normally hold the said chains in a raised position, as shown in Fig. 1 when the brake is not in use to prevent the same from dragging along the ground or coming into contact with any moving objects.

It is apparent from the foregoing description, taken in connection with the accompanying drawings, that I have provided an emergency brake for automobiles which is positive in action when stopping the vehicle much more quickly and readily than can be accomplished by the brakes as ordinarily constructed without necessitating the stoppage of the motor or engine. It is to be understood further that other minor changes in proportions, dimensions and details may be resorted to without departing from the spirit of the present invention but which come within the scope of the appended claim.

Having thus fully described my invention, what I claim as new and desire to secure by Letters Patent, is:—

In a device of the class described, in combination with a vehicle, separate pivoted supporting members each being a rigid integer, a rock shaft, a crank arm on said shaft, a rigid rod connecting one of said members to said crank arm, a double crank arm on said rock shaft, a second rigid rod connecting said double crank arm and another of said supporting members, a lever, a rigid rod connecting said lever and said double crank arm, said parts forming means whereby the supporting members are positively operated, chains fastened to the vehicle against yielding movement bodily, one chain being connected to each of said supporting members below the rods connected thereto and to the vehicle against yielding movement bodily, said chain limiting the movement of the supporting members, and springs intermediate the ends of the chains connected to said chain and said crank arm to prevent dragging of the chain.

ROBERT A. HOUSTON.

Witnesses:
 CHARLES WILLIAMS,
 GEORGE GRIM.